United States Patent [19]

Bathen

[11] 4,203,062
[45] May 13, 1980

[54] MACHINE TOOL CONTROL SYSTEM

[76] Inventor: Roland Bathen, 31 Hölderlinstrasse, Weissach, Fed. Rep. of Germany

[21] Appl. No.: 911,610

[22] Filed: Jun. 1, 1978

[30] Foreign Application Priority Data

Jun. 2, 1977 [DE] Fed. Rep. of Germany ....... 2724808

[51] Int. Cl.² ............................................. G05B 19/24
[52] U.S. Cl. ...................................... 318/571; 318/39; 335/274
[58] Field of Search .......................... 318/571, 39, 135; 335/274, 230

[56] References Cited

U.S. PATENT DOCUMENTS

| | | | |
|---|---|---|---|
| 3,174,367 | 3/1965 | Lukens | 318/571 X |
| 3,273,182 | 9/1966 | McDonald | 318/571 X |
| 3,454,799 | 7/1969 | Albinger, Jr. | 335/274 X |
| 3,573,588 | 4/1971 | Geyer et al. | 318/571 |
| 3,698,268 | 10/1972 | Cutler | 318/571 X |

Primary Examiner—B. Dobeck
Attorney, Agent, or Firm—Murray and Whisenhunt

[57] ABSTRACT

The invention relates to an attachment for the machining by stock removal of parts to be turned, particularly such which have surface longitudinal profiles which differ from the exact circular shape and may furthermore be irregular, with the aid of a tool whose in-feed movements are brought about by an electrically contolled servo-motor, whose follow-up time is very short, so that the tool nose can follow the pattern of the desired non-circular shapes without any limitation of the cutting speed which are usual in turning.

The machine to control system comprises spindle transmitter means for providing a signal indicative of the angular position of the machine tool spindle, position transmitter means for providing a signal indicative of the relative axial position of the machine tool cutting head and a work piece rotatable by said tool spindle, control means for storing information representing desired angular and longitudinal parameters of the desired workpiece shape and including first and second inputs for receiving the signals from said position and spindle transmitters respectively and an output for actuating said motor means in dependence upon the stored information and said input signals, and an electromagnetic plunger-type coil motor connected to receive the output signal from said control means and cutting head for moving said head towards and away from the axis of the tool spindle.

5 Claims, 2 Drawing Figures

MACHINE TOOL CONTROL SYSTEM

BACKGROUND TO THE INVENTION

The invention relates to an attachment for the machining by stock removal of parts to be turned, particularly such which have surface longitudinal profiles which differ from the exact circular shape and may furthermore be irregular, with the aid of a tool whose in-feed movements are brought about by an electrically controlled servo-motor, whose follow-up time is very short, so that the tool nose can follow the pattern of the desired non-circular shapes without any limitation of the cutting speeds which are usual in turning. The use of an electrically controlled servo-motor is advantageous inasmuch as the templates and master pieces which are required on heretofore known non-circular turning lathes and from which the tool in-feed movements are traced by mechanical tracing through a control lever, can be entirely dispensed with. With the aid of known electronic data processing equipment, it is possible to store in digital or analogue form the desired three-dimensional shape of the part to be turned and to process it in such a way that the electric voltage which is analogous to the distance between the turning centre and the workpiece tip required at the respective workpiece location can be fed at the correct moment as a control signal to the electrically controlled servo-motor in synchronism with the working movements of the machine tool.

Such machine tool including controlled servo motor is known from German Pat. No. 12 68 936, wherein the servo-motor is formed by a magnetostrictive body which is surrounded by a coil through which current flows. Although working inaccuracies caused by play and wear influences, such as occur on devices which follow rotating master cams by means of a lever system for transmission to the part to be turned, are avoided on this known construction, the main disadvantage thereof consists in the fact that the controlling element length changes attainable by magnetostriction are very small in relation to the original control element length so that, in order to bring about sufficiently large in-feed movements, it is necessary to use very long magnetostrictive bodies, which are consequently difficult to accommodate, or to increase the control movement to the practically required value through mechanical transmission members, such as levers and the like, which entails a loss in accuracy.

The object underlying the invention is to avoid this disadvantage and to provide an attachment which requires little space and allows nevertheless a rapidly responding and exact in-feed movement of the tool.

SUMMARY OF THE INVENTION

According to the invention there is provided a control system for a machine tool including a spindle for rotating a work piece to be machined and a cutting head mounted for relative movement towards and away from the axis of the spindle, comprising; spindle transmitter means for providing a signal indicative of the angular position of the machine tool spindle, position transmitter means for providing a signal indicative of the relative axial position of the machine tool cutting head and the workpiece rotatable by said tool spindle, control means for storing information representing desired angular and longitudinal parameters of the desired workpiece shape and including first and second inputs for receiving the signals from said position and spindle transmitter means respectively and an output for providing a signal dependent upon the stored information and said input signals, an electromagnetic plunger-type coil motor having its plunger mechanically coupled directly to said cutting head for moving said head towards and away from the axis of the tool spindle, transducer means having an output to provide signals indicative of the respective position of the plunger, and a positional control means having two inputs connected respectively to the output of said control means and the output of said transducer means, an output connected to the plunger coil, and comparator means which compares these signals arriving at the two inputs and, in the event of any difference existing between the actual value and the nominal value, emits a correcting signal to the plunger coil to determine the position of the cutting head.

The proportionality between the electric current fed in and the control stroke imparted may be brought about, for example, by the use of members which impede the control movement in proportion to the displacement, such as springs, as well as by the use of a positional control circuit.

A plunger-type coil motor is particularly advantageous. It takes up little space, since it consists only of a few simple and small parts. A plunger-type coil reacts very quickly to the change in the current flowing through it and has only small moving masses. The plunger-type coil motor therefore allows accurate and rapidly operative linear in-feed movements. Finally, the deflectability of the plunger-type coil is only limited by the coil length or its guide system. Due to the fact that the plunger-type coil allows relatively large deflections, it is possible to attach the tool directly to the plunger, advantageously without any intermediate members.

Over and above this, it is expedient to guide the plunger through deflectable diaphragms. In fact, there is no play at all in the guidance through diaphragms. Furthermore, the diaphragms serve for applying a restoring force in the opposite direction to the in-feed movement and thus to set a specific ratio between the current fed in and the emitted displacement to be set. If required, it is advantageous to linearise the adjusting movement additionally by an electric position control circuit and thus to prevent the influence of disturbance forces on the position of the tool, which is secured on the plunger-type coil.

Further advantages of the invention will emerge from the following description of an exemplfied embodiment.

DESCRIPTION OF PREFERRED EMBODIMENT

Figure 1:
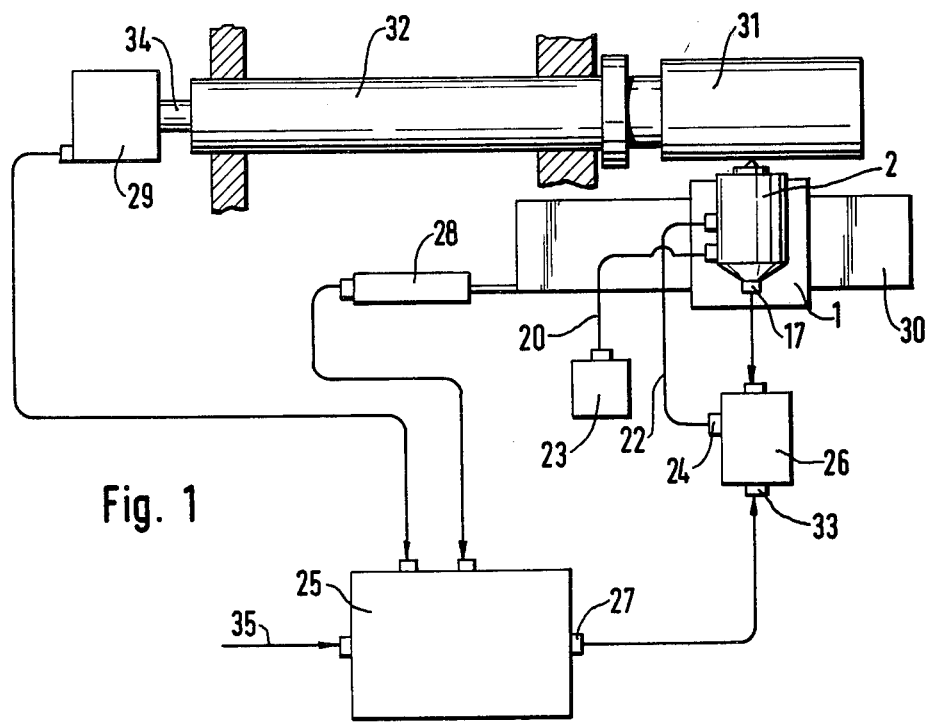
FIG. 1 shows a diagrammatical illustration of the attachment.
Figure 2:
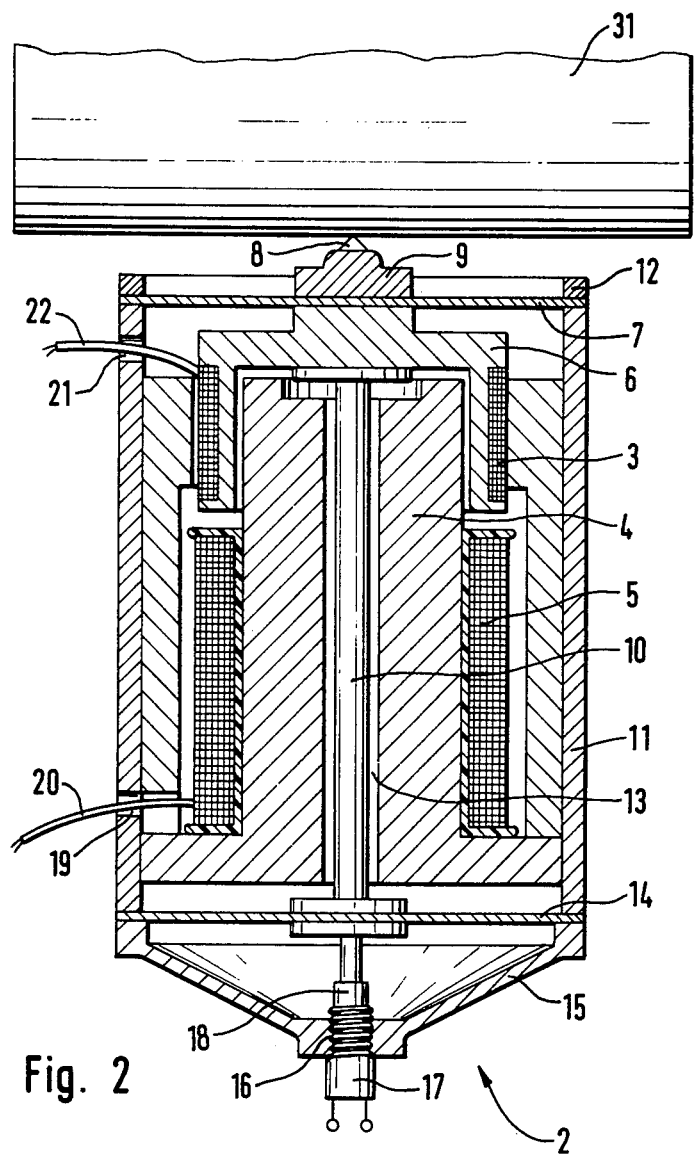
FIG. 2 shows a longitudinal section through the plunger-type coil motor.

A plunger-type coil servo-motor 2 (see FIG. 1) is secured on a cross slide 1. The plunger-type coil servo-motor 2 consists, for example as shown in FIG. 2, of a plunger-type coil 3 and an excitation coil 5 surrounding a soft-iron core 4. The plunger-type coil 3 is attached to a cup-shaped member 6. At its front end, the member 6 is screwed to a diaphragm 7, which can be deflected in the direction of the in-feed movement, and a retaining ring 9 holding the tool 8 and at its end that is remote from the tool 8, it is screwed to a rod 10 which projects in the direction of the in-feed movement. The diaphragm 7 is firmly clamped on its outer edge between the front surface of a cylindrical housing 11 and a ring 12. The rod 10 engages with play in a central bore 13 of the soft-iron core 4, which is surrounded by the excitation coil 5, and is screwed at its end that is remote from the member 6 to a second diaphragm 14, which can be deflected in the direction of the in-feed movement. On its outer edge, the diaphragm 14 is firmly clamped between the front surface of the housing 11 that is remote from the member 6 and a housing cover 15.

Screwed into a central threaded bore 16 of the housing cover 15 is a displacement pick-up 17, whose plunger portion 18 is screwed to the diaphragm 14 and the rod 10. The current feed line 20 for the excitation coil 50 passes from a bore 19 through the housing 11 and the line 22 for the plunger-type coil 3 passes through from a bore 21 in the housing.

The excitation coil 5 is connected to a current source 23 through the line 20. The plunger-type coil 3 is connected to the output 24 of an electric position control 26 through the line 22. The position control 26 is furthermore connected to the displacement pick-up 17 and the output 27 of a control unit 25, in which the desired shape of the workpiece to be machined is stored in digital or analogue form. The control unit 25 is connected to a slide position transmitter 28 scanning the position of the tool working slide 30 and a spindle position transmitter 29 scanning the position of the work spindle 32. The runner 34 of the spindle position transmitter 29 is secured directly to the shaft 32 carrying the part to be turned 31.

The attachment comprising the plunger-type motor shown in FIG. 2 operates as follows:

During the machining of the part 31 to be turned, the spindle position transmitter 29 produces an electric signal which corresponds to the respective angular position of the shaft 32. Likewise, the electric signal emitted by the slide position transmitter 28 represents the respective position of the saddle 30 during machining. Both signals are fed continuously into the control unit 25. The data of the path points of the desired three-dimensional shape of the part 31 to be turned, which path points are associated with the respective angular position of the shaft 32 and the respective longitudinal position of the saddle 30, are stored in the control unit 25 in known manner. They are processed in the control unit 25 into common electric information which corresponds to the instantaneous value of the distance between the nose of the tool 8 and the central axis of the shaft 32. The data of the three-dimensional external shape desired for the part 31 to be turned are input into the control unit 25 with the aid of the known data transmission means through the data input 35 piror to the machining of the first part to be turned. The information processed by the control unit 25 is available at the output 27 of the control unit 25 and flows to the input 33 of the electric position control 26 which causes the plunger-type coil servo-motor 2 to set the distance between the nose of the tool 8 and the central axis of the shaft 32, which distance corresponds to the electric information given by the control unit 25, with a very minimal follow-up time.

The respective actual position of the tool 8 is detected and passed on to the positional control 26 by the displacement pick-up 17. This actual value is compared in the position control with the nominal tool position value specified by the control unit. In the event of any difference, the position control 26 ensures that the signals emitted through the line 22 of the plunger-type coil 3 are corrected.

Figure 3:
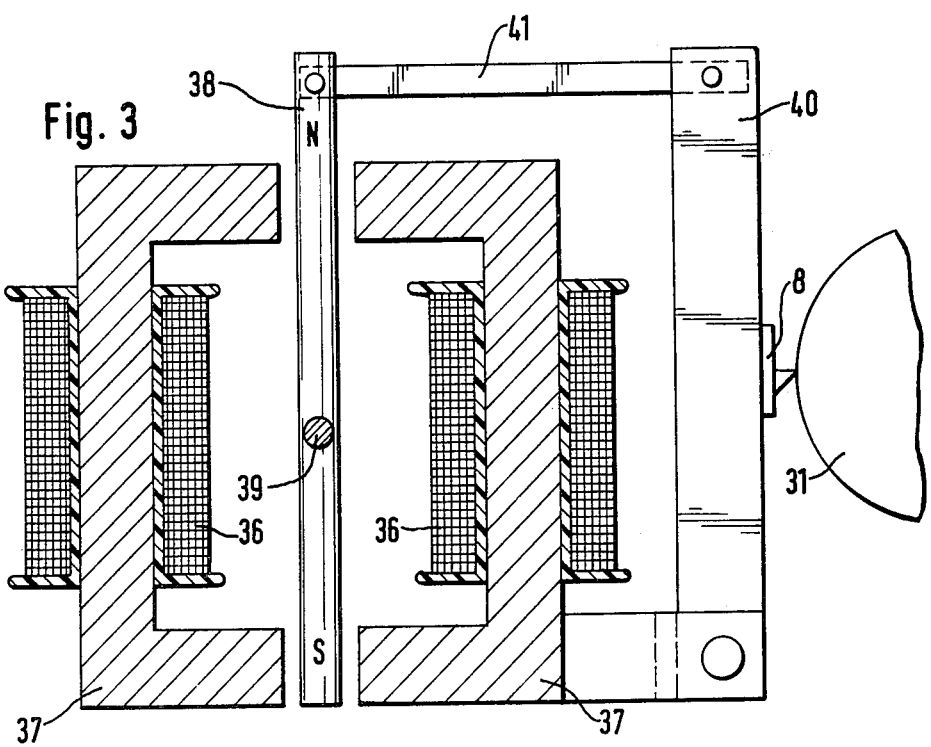

An alternative form of servo-motor is shown in FIG. 3 and comprises a torque motor having two soft-iron cores 37 which are enclosed by electric coils 36 and between whose poles an armature 38 is mounted through a torsion spring 39. The electric control pulses from output 27 reproducing the shape of the workpiece 31 to be machined are fed to the coils 36. The magnetic poling of the soft-iron cores 37 effected through the coils 36 causes the armature, which is designed as a permanent magnet, to be rotated round the axis of the torsion spring 39. The deflection of the armature 38 is transmitted through a lever mechanism 40, 41 to the tool 8, with which the workpiece 31 is machined.

I claim:

1. A control system for a machine tool including a spindle for rotating a workpiece to be machined and a cutting head mounted for relative movement towards and away from the axis of the spindle comprising:
    (a) spindle transmitter means for providing a signal indicative of the angular position of the machine tool spindle,
    (b) position transmitter means for providing a signal indicative of the relative axial position of the machine tool cutting head and the workpiece rotatable by said tool spindle,
    (c) control means for storing information representing desired angular and longitudinal parameters of the desired workpiece shape and including first and second inputs for receiving the signals from said position and spindle transmitter means respectively and an output for providing a signal dependent upon the stored information and said input signals,
    (d) an electromagnetic plunger-type coil motor having its plunger mechanically coupled directly to said cutting head for moving said head towards and away from the axis of the tool spindle,
    (e) transducer means having an output to provide signals indicative of the respective position of the plunger, and
    (f) positional control means having two inputs connected respectively to the output of said control means and the output of said transducer means, an output connected to the plunger coil, and comparator means which compares these signals arriving at the two inputs and, in the event of any difference existing between the actual value and the nominal value, emits a correcting signal to the plunger coil to determine the position of the cutting head.

2. A control system according to claim 1, wherein said electromagnetic plunger-coil motor comprises a housing, an excitation coil located in said housing, a soft-iron core located within said excitation coil, and a resilient element carried at its outer edge by said housing and said housing serving as a mounting for said plunger coil.

3. A control system according to claim 2, including a further resilient element carried at its outer edge by said housing, the two resilient elements being disposed one at each end thereof, and a rod passing through a bore in said soft-iron core connected at one end to said plunger and at the other end to said further resilient element.

4. A control system according to claim 3, wherein said transducer means has an armature which is carried by said further resilient member.

5. A control system according to claim 3, wherein said resilient members are in the form of diaphragms.

* * * * *

REEXAMINATION CERTIFICATE (819th)
United States Patent
Bathen

[11] B1 4,203,062
[45] Certificate Issued  Mar. 1, 1988

[54] MACHINE TOOL CONTROL SYSTEM

[75] Inventor: Roland Bathen, Weissach, Fed. Rep. of Germany

[73] Assignee: Mahle GmbH, Stuttgart, Fed. Rep. of Germany

Reexamination Request:
No. 90/001,193, Mar. 16, 1987

Reexamination Certificate for:
Patent No.: 4,203,062
Issued: May 13, 1980
Appl. No.: 911,610
Filed: Jun. 1, 1978

[30]  Foreign Application Priority Data

Jun. 2, 1977 [DE] Fed. Rep. of Germany ....... 2724808

[51] Int. Cl.⁴ ................... G05B 19/25; B23B 25/06
[52] U.S. Cl. ................................. 318/571; 318/39; 82/2 B; 82/21 B; 82/24 R; 335/274
[58] Field of Search ............... 318/653, 119, 122, 135, 318/39, 571, 573; 310/14; 364/474; 409/293; 335/274, 230; 82/2 B, 24 R; 21 B

[56]  References Cited

U.S. PATENT DOCUMENTS

| | | | |
|---|---|---|---|
| 3,174,367 | 3/1965 | Lukens | 318/571 X |
| 3,273,182 | 9/1966 | McDonald | 318/571 X |
| 3,454,799 | 2/1969 | Albinger | 335/274 X |
| 3,573,588 | 4/1971 | Geyer et al. | 318/571 |
| 3,698,268 | 10/1972 | Cutler | 318/571 X |
| 3,753,384 | 8/1973 | Anfindsen | 409/293 |
| 3,766,369 | 10/1973 | Watanabe et al. | 318/573 |
| 4,027,245 | 5/1977 | Bourrat et al. | 364/474 |

FOREIGN PATENT DOCUMENTS

| | | |
|---|---|---|
| 1268936 | 5/1968 | Fed. Rep. of Germany . |
| 91179 | 7/1972 | German Democratic Rep. . |
| 104223 | 3/1974 | German Democratic Rep. . |

*Primary Examiner*—B. Dobeck

[57]  ABSTRACT

The invention relates to an attachment for the machining by stock removal of parts to be turned, particularly such which have surface longitudinal profiles which differ from the exact circular shape and may furthermore be irregular, with the aid of a tool whose in-feed movements are brought about by an electrically controlled servo-motor, whose follow-up time is very short, so that the tool nose can follow the pattern of the desired non-circular shapes without any limitation of the cutting speed which are usual in turning.

The machine to control system comprises spindle transmitter means for providing a signal indicative of the angular position of the machine tool spindle, position transmitter means for providing a signal indicative of the relative axial position of the machine tool cutting head and a work piece rotatable by said tool spindle, control means for storing information representing desired angular and longitudinal parameters of the desired workpiece shape and including first and second inputs for receiving the signals from said position and spindle transmitters respectively and an output for actuating said motor means in dependence upon the stored information and said input signals, and an electromagnetic plunger-type coil motor connected to receive the output signal from said control means and cutting head for moving said head towards and away from the axis of the tool spindle.

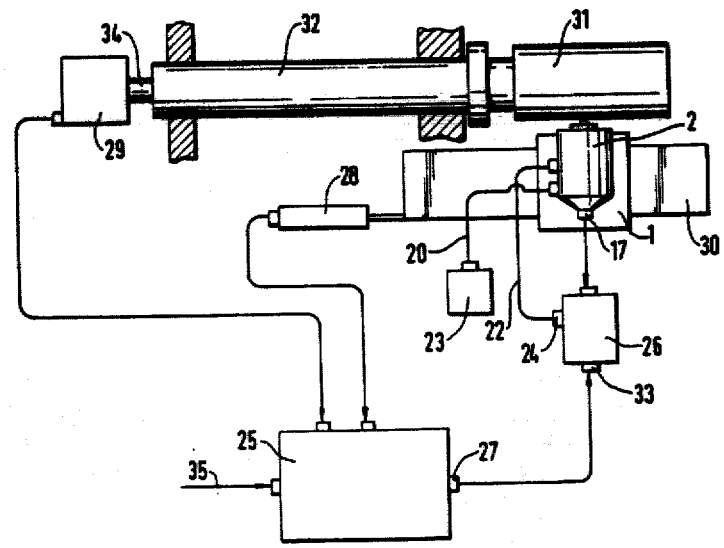

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, between lines 4 and 5, insert the following paragraph:

*FIG. 3 shows a longitudinal section through an alternative form of a servo-motor for moving a cutting head towards and away from a spindle axis.*

AS A RESULT OF REEXAMINATION, IT HAS BEEN DETERMINED THAT:

Claims 2, 3 and 5 are cancelled.

Claims 1 and 4 are determined to be patentable as amended.

1. A control system for a machine tool including a spindle for rotating a workpiece to be machined and a cutting head mounted for relative movement towards and away from the axis of the spindle, comprising:
   (a) spindle transmitter means for providing a signal indicative of the angular position of the machine tool spindle,
   (b) position transmitter means for providing a signal indicative of the relative axial position of the machine tool cutting head and the workpiece rotatable by said tool spindle,
   (c) control means for storing information representing desired angular and longitudinal parameters of the desired workpiece shape and including first and second inputs for receiving the signals from said position and spindle transmitter means respectively and an output for providing a signal dependent upon the stored information and said input signals,
   (d) an electromagnetic plunger-type coil motor having [its] *a* plunger mechanically coupled directly to said cutting head for moving said head towards and away from the axis of the tool spindle, *said motor comprising a housing, an excitation coil located in said housing, a plunger coil carried by said plunger, a soft-iron core located within said excitation coil, and a resilient element carried at its outer edge by said housing, said motor additionally comprising a further resilient element carried at its outer edge by said housing, the two resilient elements being disposed one at each end of said housing, and a rod passing through a bore in said soft-iron core connected at one end to said plunger and at the other end to said further resilient element, said resilient elements taking the form of diaphragms, said plunger and said plunger coil being movably mounted to said housing via said resilient elements,*
   (e) transducer means having an output to provide signals indicative of the respective position of the plunger, and
   (f) positional control means having two inputs connected respectively to the output of said control means and the output of said transducer means, an output connected to the plunger coil, and comparator means which compares these signals arriving at the two inputs and, in the event of any difference existing between the actual value and the nominal value, emits a correcting signal to the plunger coil to determine the position of the position of the cutting head.

4. A control system according to claim [3] *4*, wherein said transducer means has an armature which is carried by said further resilient [member] *element*.

* * * * *